United States Patent [19]
Yoshimura et al.

[11] Patent Number: 5,619,264
[45] Date of Patent: Apr. 8, 1997

[54] AUTOMATIC FOCUSING DEVICE

[75] Inventors: Katsuji Yoshimura; Masamichi Toyama; Akihiro Fujiwara, all of Kanagawa-ken; Kunihiko Yamada, Tokyo; Hirofumi Suda, Kananawa-ken, all of Japan

[73] Assignee: Canon Kabushiki Kaisha, Tokyo, Japan

[21] Appl. No.: 202,709

[22] Filed: Feb. 23, 1994

Related U.S. Application Data

[63] Continuation of Ser. No. 81,864, Jun. 23, 1993, abandoned, which is a continuation of Ser. No. 815,904, Dec. 31, 1991, abandoned, which is a continuation of Ser. No. 451,754, Dec. 18, 1989, abandoned, which is a continuation of Ser. No. 154,078, Feb. 9, 1988, abandoned.

[51] Int. Cl.$^6$ .................................................. H04N 5/232
[52] U.S. Cl. ............................................ 348/352; 348/350
[58] Field of Search ................................. 348/345, 349, 348/352, 354, 356, 358; 250/201.2, 201.7, 201.8; 354/402, 403, 406; 548/169, 170, 135, 142, 350; H04N 5/232

[56] References Cited

U.S. PATENT DOCUMENTS

| | | | |
|---|---|---|---|
| 4,249,207 | 2/1981 | Harman et al. | 358/108 |
| 4,714,966 | 12/1987 | Saito et al. | 358/228 |
| 4,734,777 | 3/1988 | Okino et al. | 358/228 |
| 4,872,051 | 10/1989 | Baba | 358/227 |
| 5,031,049 | 7/1991 | Toyama et al. | 358/227 |

*Primary Examiner*—Wendy Garber
*Assistant Examiner*—Tuan V. Ho
*Attorney, Agent, or Firm*—Robin, Blecker, Daley & Driscoll

[57] ABSTRACT

In the automatic focusing device having an object image variation detecting circuit for quantitatively detecting a variation of an object image on the image pickup plane of an image pickup element so that the focusing operation is controlled in accordance with the amount of variation of the object image detected by the object image variation detecting circuit, there are provided a stop control circuit for controlling the period for stopping the focusing operation when panning depending on whether the amount of variation of the object image is large or small, a characteristic varying circuit for varying the frequency band of the picked-up image signal to be used in the focus detection depending on whether the amount of variation of the object image at the time of the focusing operation is large or small, and a pass characteristic varying circuit for varying the focus detection area on the image pickup plane depending on whether the amount of variation of the object image is large or small.

33 Claims, 11 Drawing Sheets

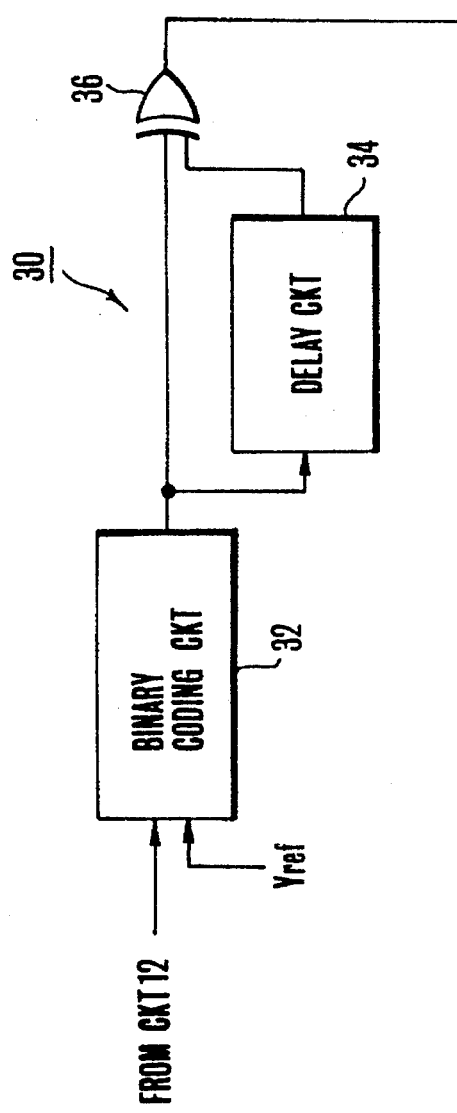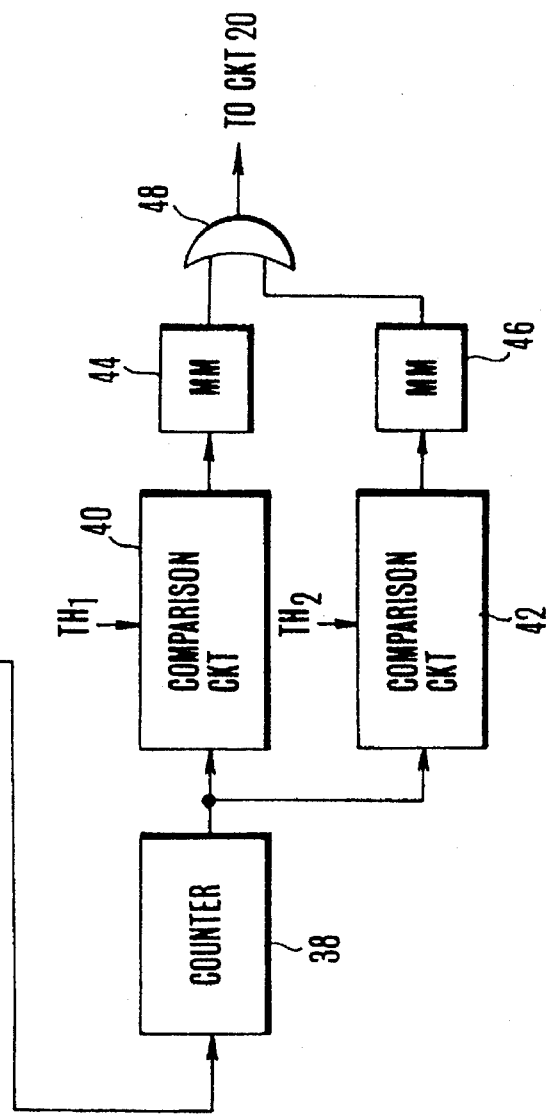
FIG.7

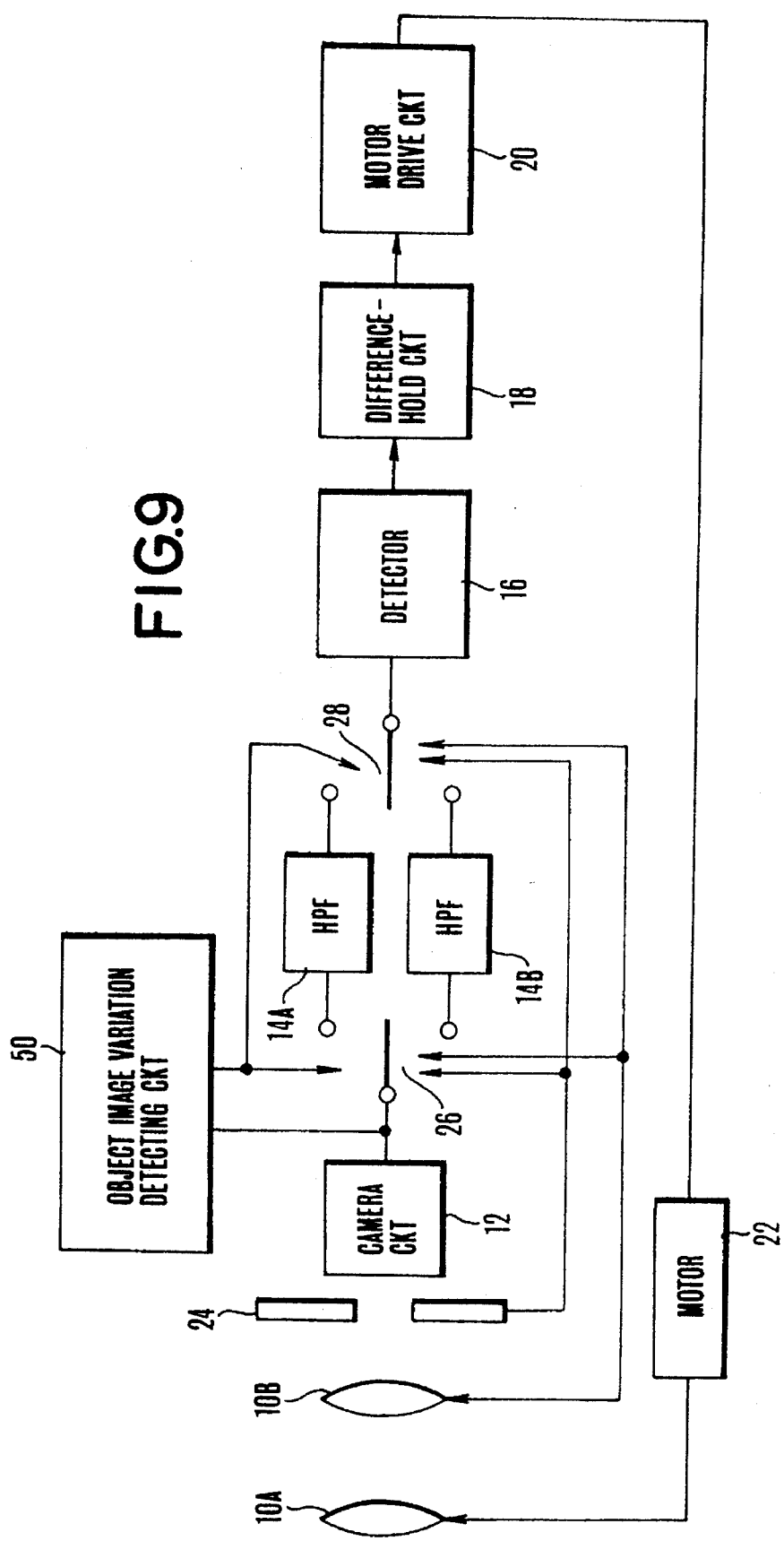

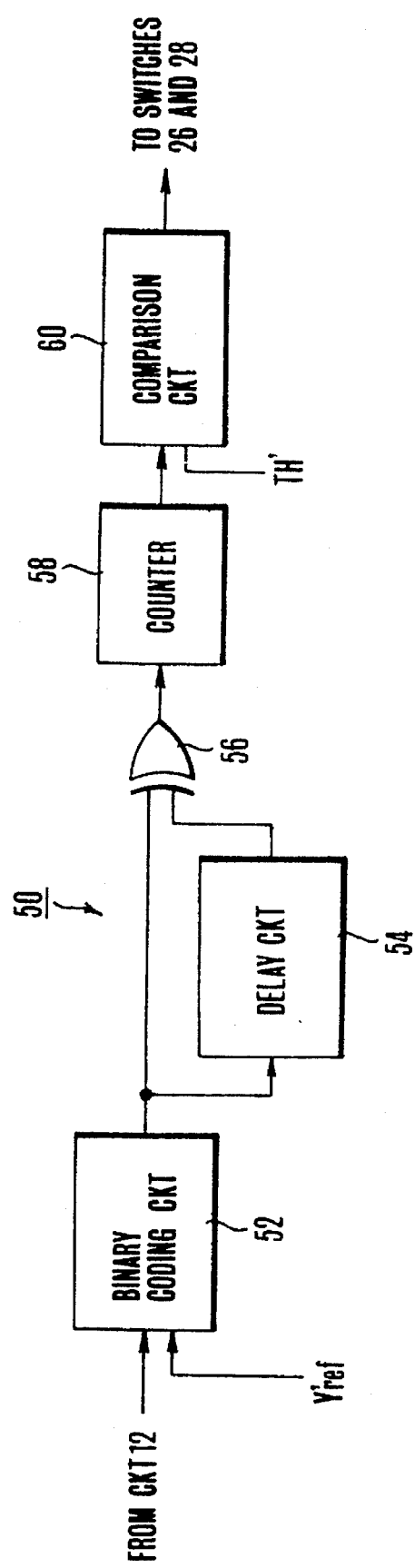

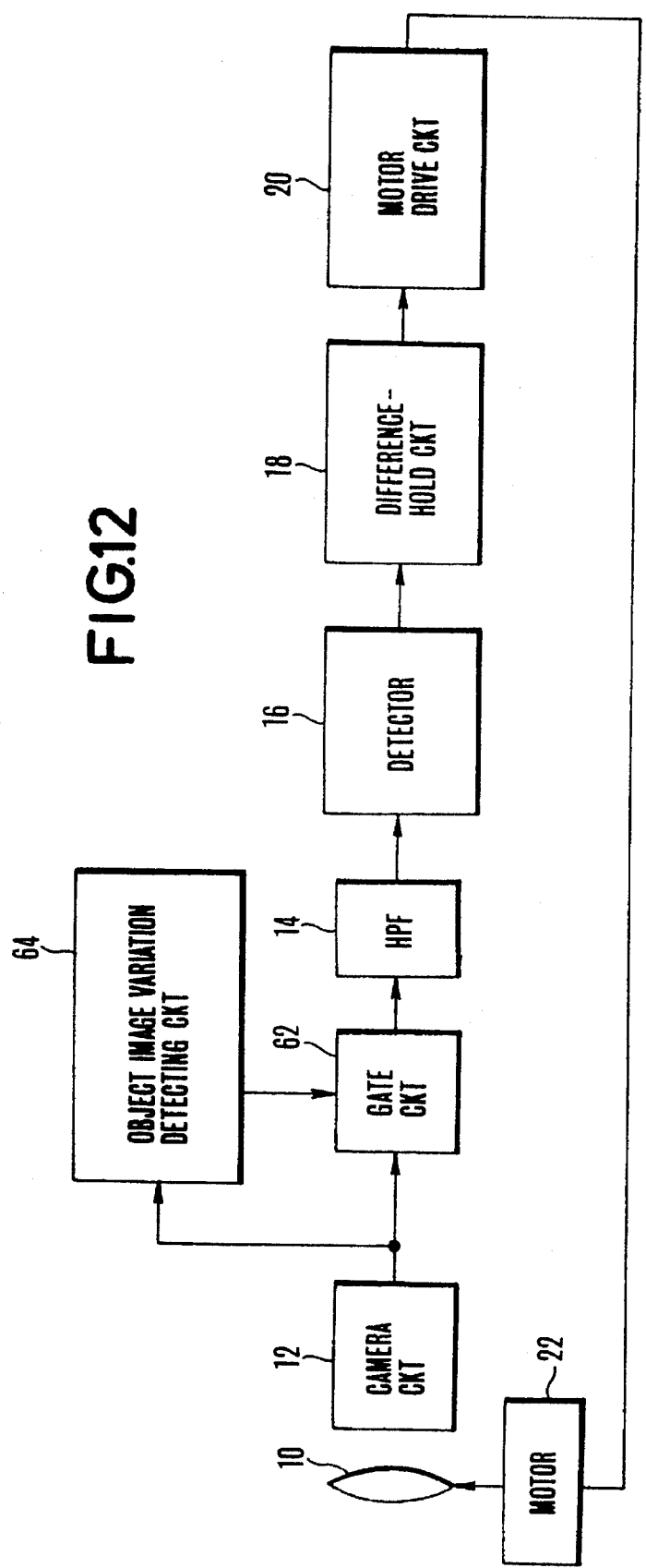

AUTOMATIC FOCUSING DEVICE

This is a continuation application under 37 CFR 1.62 of prior application Ser. No. 08/081,864, filed Jun. 23, 1993, now abandoned, which is a continuation of Ser. No. 07/815,904 filed Dec. 13, 1991 (abandoned), which is a continuation of Ser. No. 07/451,754 filed Dec. 18, 1989 (abandoned), which is a continuation of Ser. No. 07/154,078 filed Feb. 9, 1988 (abandoned).

BACKGROUND OF THE INVENTION

1. Field of the Invention

This invention relates to automatic focusing devices and, more concretely, to automatic focusing devices for camera having image pickup means, such as video cameras.

2. Description of the Related Art

Conventionally the automatic focusing device of the video camera has employed the so-called "hill climb method" as was derived by noticing that the high-frequency component in the video signal corresponds to the degree of fineness of the shot picture. To control focusing, the focus adjusting ring (hereinafter referred to as the "helicoid") of the photographic optical system is rotated so that that high-frequency component becomes maximum. This method is described in detail in "NHK Technology Research Report" in p. 21, vol. 17, No. 1, 1965, Ser. No. 86, entitled "Automatic Focus Adjustment of the Television Camera by the Hill Climb Servo Mehod" by Ishida et al.

FIG. 1 in block diagram shows the fundamental structure of the automatic focusing device based on this hill climb method. A lens 10 serving as photographic optical system forms an image on a focal plane which is converted to an electrical video signal by a camera circuit 12. As the video signal produced from the camera circuit 12 includes a high-frequency component, a high-pass filter (HPF) 14 extracts it. The high-frequency component from the HPF 14 is detected by a detector 16. The output level of the detector 16 is proportional to the amount of the high-frequency component, representing the degree of fineness of the image of an object to be photographed. In relation to the adjusted position of the helicoid, the output level of the detector 16 has a characteristic of upward convexity as shown in FIG. 2 with the center at the focusing position A of the sharpest focus. A difference-hold circuit 18 samples and holds the output of the detector 16 (hereinafter referred to as the "focus voltage" in predetermined discrete times, and produces an output signal corresponding to the amount of temporal variation of the focus voltage. That is, the output signal of the difference-hold circuit 18, as shown by a characteristic curve in the lower half of FIG. 2, takes a zero point at the focusing position A. On its front and rear sides, the polarity of the signal inverts, taking the opposite signs to each other, or the positive and negative ones respectively. It should be noted that the characteristics shown in FIG. 2 remain the same regardless of whether the focusing of the lens is performed from the closest object distance to infinity, or vice versa.

A motor drive circuit 20 determines which direction in which an electric motor 22 for driving the lens 10 (more specifically, its helicoid) is to be rotated, depending on the polarity of the output of the difference-hold circuit 18. For another system, also depending on the level of the output of the difference-hold circuit 18, the speed of rotation of the motor 22 is adjusted. In such a manner, the helicoid controlling loop of the motor 22 climbs the hill of the characteristic of the focus voltage produced from the detector 16, finally reaching the peak of this hill. In other words, the motor 22 is controlled so that it stops when the focus voltage reaches a maximum at the in-focus position A.

But, this arrangement has the following problem. That is, because the system operates in such a manner that when the in-focus point is reached, the motor 22 stops, whereby the focus voltage produced from the detector 16 becomes constant, if, in this state, the object to be photographed is altered by panning, or hand-shake, or like situation is encountered, the object image on the image pickup surface of the camera circuit 12 changes to decrease the high-frequency component. Therefore, the level of the focus voltage produced from the detector 16 lowers as shown in FIG. 3. As far as the control loop of FIG. 1 is concerned, the object to be photographed or the camera is then taken as having moved, and the motor 22 is driven again so as to maximize the focus voltage. Since, in this situation, the distance between the object and this video camera actually remains unchanged, the excursion of the lens 10 stops at the same position as before the re-energization of the motor, and the focus voltage comes to rest at the same level as before the re-energization of the motor as shown in FIG. 3. The occurrence of such an operation results in the production of a large defocus for a while. Hence the shot picture becomes very unnatural and uncomfortable to view.

To solve this, a method has been proposed (in Japanese Laid-Open Patent Application No. Sho 57-208520) that when the object image on the image pickup plane suddenly varies or changes, energization of the motor 22 is prohibited for a prescribed time. For this purpose, a circuit is provided for detecting the above-described variation or change of the object image. During the time when the object image on the image pickup plane of the image pickup element changes, the connection between the hill climb computer portion (for example, the difference-hold circuit 18) and the motor drive portion (for example, the motor drive circuit 20) is cut off by means of a gate circuit to interrupt the hill climbing operation for a time. But, there is an alternative problem that the relationship between the period of varying of the object image or the panning period and the time point at which the motor 22 is to be energized again is uncertain.

Meanwhile, on consideration of another case where, as the automatic focusing on the object to be photographed goes on, when it happens that object no longer stands still, but starts moving to vary the object image on the image pickup plane, according to the above-described conventional example of FIG. 1, variation of the object causes the focus voltage to vary. Thus, the difference-hold circuit output shown in FIG. 2 cannot be obtained. As a result, an erroneous operation takes place in the hill climb process. Hence there is some possibility of occurrence of an accidental large defocus.

Also, if the hill climbing operation is interrupted each time the object to be photographed starts to move, there is a drawback that it takes a very long time from the stoppage of the object to the attainment of the sharp focus on the object.

Therefore, a device capable of correcting the characteristic of the automatic focusing operation in accordance with variation of the object to be photographed during the time when automatic focusing is performed is desired.

Also, further, in general, according to such a video camera, there is the following drawback too. That is, when focus adjustment is carried out, it is usual that the light receiving plane of the solid state image pickup element is given an area for automatic focusing of a prescribed size (hereinafter called "distance measuring" area), and the automatic focusing operation is performed by the signal from this area. But, the lens used in the video camera is a zoom lens whose range is usually 4–10. For the object at a short distance, when in wide angle photography, the object image is present in an almost entire area of the light receiving plane. For a distant object, on the other hand, when in wide angle photography, the object image is present only in a small portion of the light receiving plane. Therefore, the unchangeability of the size of the distance measuring area leads to a possibility of occurrence of a faulty focusing operation. That is, because, in the case of the short distance with the wide angle photography, the object image oversteps the distance measuring area, the object information becomes insufficient. Conversely in the case of the long distance with the wide angle photography, an unnecessary information mixes in.

To solve such problems, a method has been proposed for enlarging or reducing the distance measuring area in response to the lens state with reference to the central portion of the light receiving plane.

But, by this prior known method, in a case when the object image falls outside the distance measuring area as the object is moving, as shown in FIG. 4, or in another case when the object image is moved beyond the distance measuring area by panning, as shown in FIG. 5, it results that the automatic focusing is controlled by using a portion of the area which does not contain the image of the object intended to be photographed. A problem arises in that focusing cannot be effected reliably on an object aimed at.

SUMMARY OF THE INVENTION

The present invention has been made to solve any of the above-described problems of the conventional automatic focusing device in the video camera, and its first object is to provide an automatic focusing device which does not make an unnatural focusing control of the photographic optical system when the image on the image pickup plane is changed by panning, etc.

To achieve this object, in an embodiment of the present invention, an automatic focusing device is provided with image pickup means, photographic optical system control means responsive to a picked-up image signal from the image pickup means for automatically controlling a photographic optical system to an in-focus position, object image variation detecting means for comparing the picked-up image signal with that produced a predetermined period before to quantitatively detect the amount of variation of an object image on an image pickup plane of the image pickup means, and stop control means for making variable a period for stopping the automatic control of the photographic optical system control means in response to the amount of variation of the object image detected by the object image variation detecting means. Accordingly, because the amount of variation of the object image on the image pickup plane is successively quantitatively detected by the object image variation detecting means, regardless of whether the panning period is long or short, the automatic focusing operation is temporarily prohibited properly. Therefore, even if the object image is varied by panning, etc., because the period in which the focus adjustment of the photographic optical system is not effected is controlled in accordance with the degree of that variation, the faulty operation of the photographic optical system can advantageously be prevented.

Also, a second object of the invention is to provide an automatic focusing device in which when a variation is occurring in the object image on the image pickup surface due to the movement of the object without a change of the entire area of the picture frame caused by panning, the hill climb control operation is permitted to continue, and in which when focusing is effected on the object image, an unnatural focusing control of the photographic optical system is prevented from occurring.

To achieve this object, according to an embodiment of the invention, an automatic focusing device is provided with image pickup means for converting an object image formed on an image pickup plane to an electrical signal, extracting means for extracting a picked-up image signal of a predetermined frequency component from the picked-up image signal from the image pickup means, object image variation detecting means for comparing the picked-up image signal with that produced a predetermined period before to quantitatively detect the amount of variation of the object image on the image pickup plane, and characteristic variable means for making variable the frequency band of the picked-up image signal to be extracted by the extracting means in response to a signal indicative of the amount of variation detected by the object image variation detecting means. By detecting the variation of the object image due to the movement of the object and limiting the frequency band of passage of the picked-up image signal from the image pickup means in response to the degree of that variation, by a proper focus signal in response to the amount of variation of the object image due to the movement of the object, the focusing control can be continued even when the object image varies.

Also, a third object of the invention is to provide an automatic focusing device which makes it possible to always accurately effect the focusing operation on an object to be photographed even when there is a motion of the object image on the image pickup plane of the image pickup means.

To achieve this, according to an embodiment of the invention, an automatic focusing device is provided with image pickup means for converting an object image formed on an image pickup plane to an electrical signal, gate means for passing only a part of a picked-up image signal produced from the image pickup means, which part corresponds to a distance measuring area set on the image pickup plane, object image variation detecting means for comparing the picked-up image signal with that produced a predetermined period before to quantitatively detect the amount of variation of the object image on the image pickup plane, and passage characteristic variable means responsive to a signal indicative of the amount of variation detected by the object image variation detecting means for making variable the passage characteristic of the gate means. Accordingly, even if the object image on the light receiving plane varies due to panning or movement of the object, this variation can quantitatively be detected by the object image variation detecting means. And, by this detection signal, the passage characteristic of the gate means that defines the distance measuring area is selected. Therefore, despite the variation of the object image on the light receiving plane, a proper focusing operation can be realized.

Other objects and features of the invention will become apparent from the following written specification and drawings.

BRIEF DESCRIPTION OF THE DRAWINGS

FIG. 7 is a block diagram illustrating the structure of an example of the object image variation detecting circuit in the embodiment of FIG. 6.

FIG. 9 is a block diagram illustrating the structure of a second embodiment of the invention.

FIG. 11 is a block diagram illustrating the structure of an example of the object image variation detecting circuit in the embodiment of FIG. 9.

FIG. 12 is a block diagram illustrating the structure of a third embodiment of the invention.

DETAILED DESCRIPTION OF THE PREFERRED EMBODIMENTS

The automatic focusing device in the invention is described in detail in connection with its embodiments below.

Figure 1:
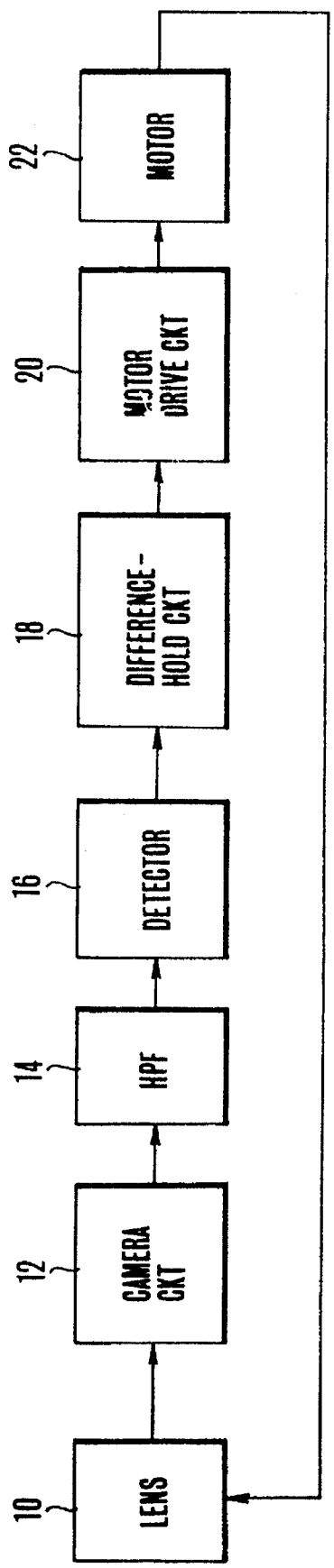
FIG. 1 is a block diagram of the fundamental structure of the conventional automatic focusing device.
Figure 2:
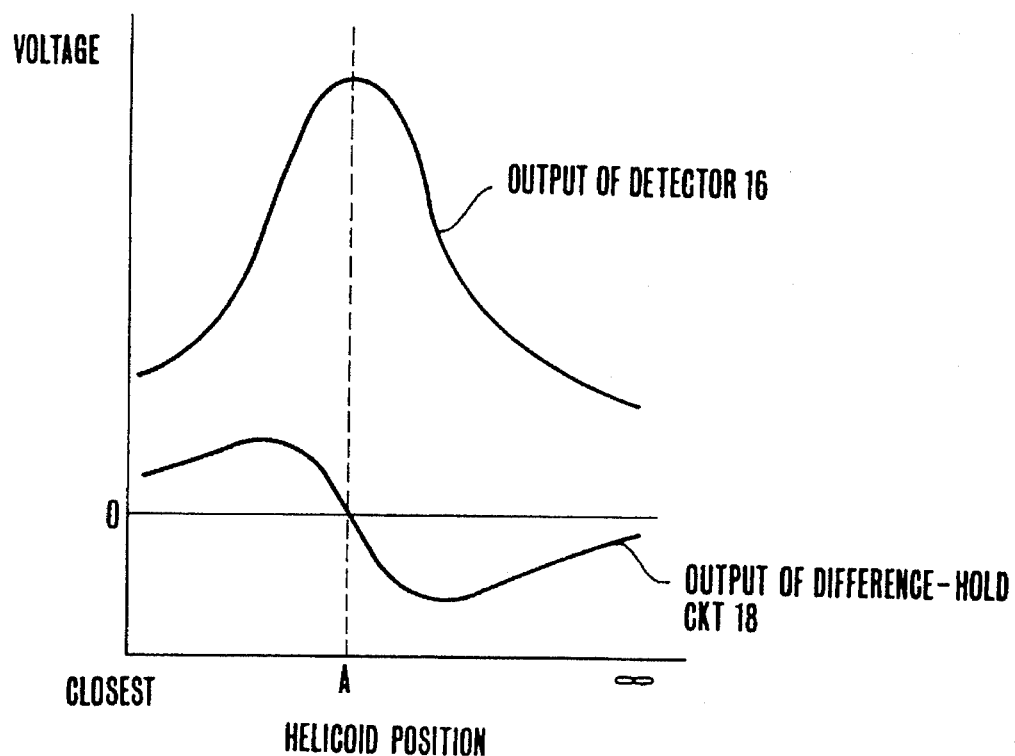
FIG. 2 is a graph of the characteristics of the conventional automatic focusing device.
Figure 6:
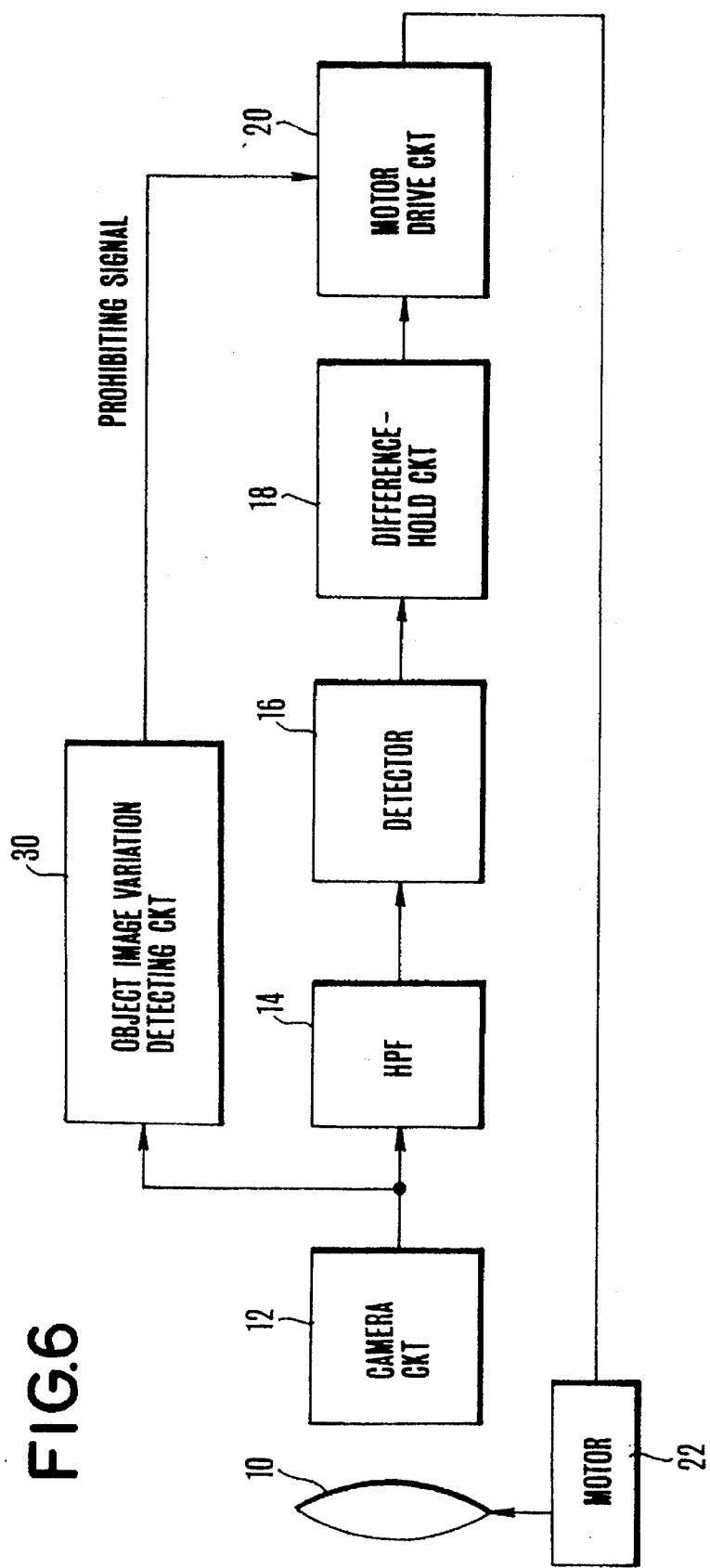
FIG. 6 is a block diagram illustrating the structure of a first embodiment of the invention.

FIG. 6 is a fundamental structure block diagram illustrating the first embodiment of the case where the invention is applied to the automatic focusing device of the hill climb type of FIG. 1, which is to accomplish the first object of the invention. The similar constituent elements to those of FIG. 1 are denoted by the same numerals, and their explanation is omitted.

This embodiment operates to quantitatively detect a variation of the object image due to panning or camera-shake. When the amount of variation is larger than a prescribed threshold value, the time for prohibiting the automatic focusing operation is increased. When the amount of variation is smaller, the time for prohibiting the automatic focusing operation is shortened. In such a manner, the time for prohibiting the automatic focusing operation can be set, always depending on the degree of variation of the object image.

In FIG. 6, the focusing control loop of the lens 10 comprising camera circuit 12, HPF 14, detector 16, difference-hold circuit 18, motor drive circuit 20 and motor 22 is fundamentally the same as the case of FIG. 1. In this embodiment, as a means for detecting panning, etc., a detecting circuit 30 for detecting the variation of the object image on the image pickup plane is provided, so that when this detecting circuit 30 applies a motor drive prohibiting signal to the motor drive circuit 20, the motor drive circuit 20, regardless of the input signal, from circuit 18 stops the driving of the motor 22.

Figure 3:
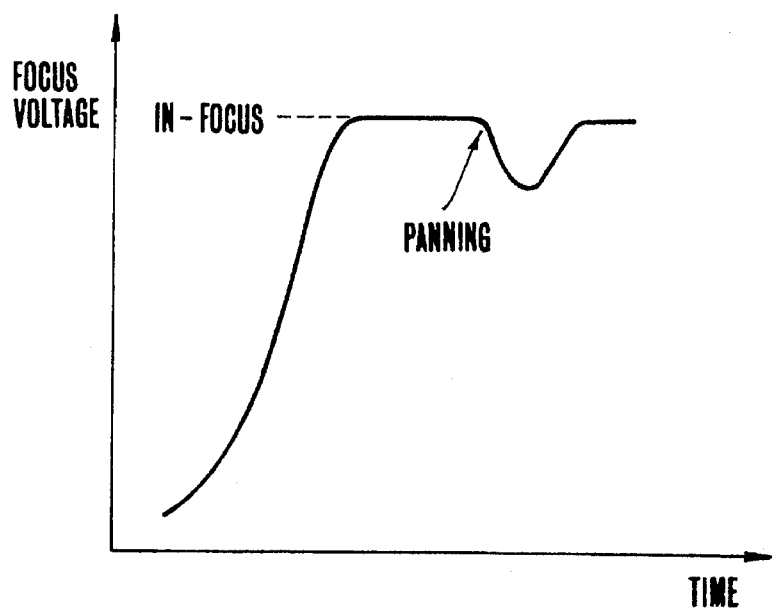
FIG. 3 is a characteristic curve illustrating the variation of the focus voltage when panning is carried out after the in-focus state has been reached.
Figure 4:
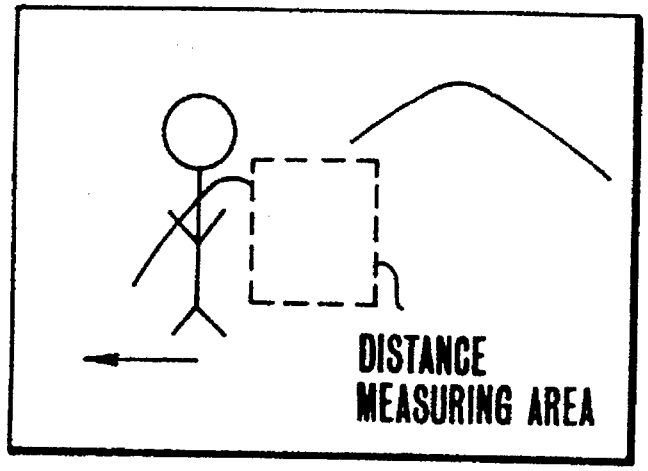
FIGS. 4 and 5 are views illustrating the varying states of the object image on the light receiving plane of the image pickup element.
Figure 5:
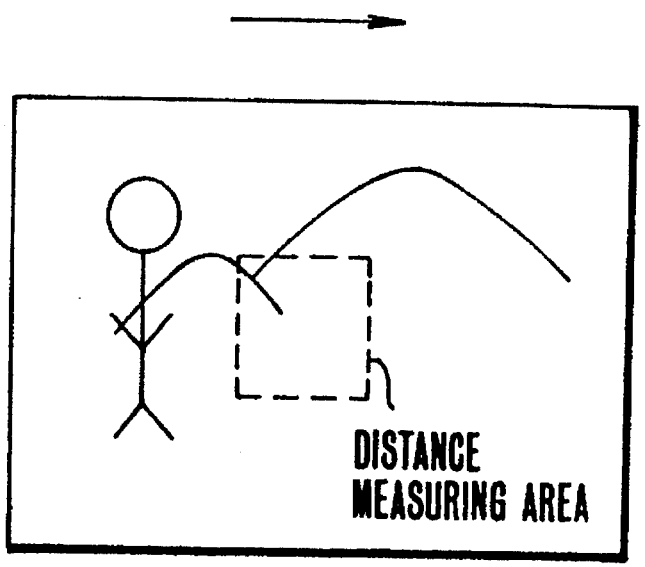
Figure 8:
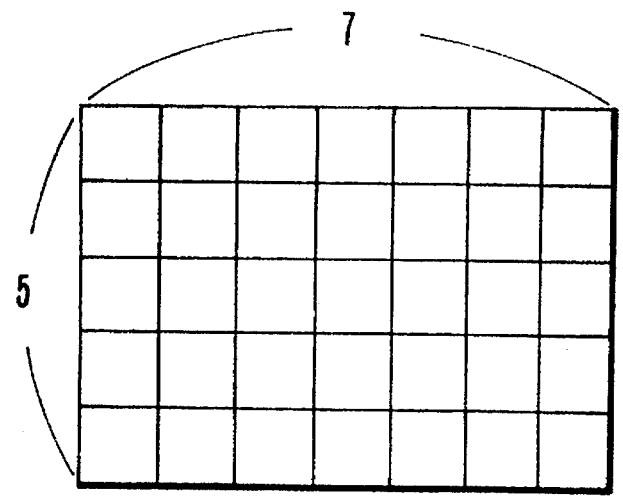
FIG. 8 is a diagram illustrating an example of partition of the image pickup plane.

One example of the object image variation detecting circuit 30 is shown in FIG. 7. The object image variation detecting circuit 30 fundamentally, as shown in FIG. 8, while the image pickup plane of the camera circuit 12 is partitioned transversely and longitudinally to a plurality of sections (in FIG. 3, 5×7), compares the average brightness of each section with that of the same section obtained one field period before. By this, the amount of variation of the object image is detected quantitatively. A binary coding circuit 32 averages (or integrates) the brightness value of the video signal from the camera circuit 12 in each section and compares it with a predetermined value Yref to produce an output in the binary form. A delay circuit 34 delays the 1-bit signal (say, 0 or 1) produced for every section from the binary coding circuit 32 by one field period. As the delay circuit 34 use may be made of an analog delay line or digital delay element in the form of a digital memory. An exclusive OR gate 36 compares the output of the binary coding circuit 32 with the output of the delay circuit 34 which is the binary signal obtained in the same section one field period before. If they differ, it produces an output "H". If they coincide, it produces an output "L". A counter 38 counts the outputs "H" of the exclusive OR gate 36 over one field. The counted value for one field of the counter 38 is an index representing the degree of variation of the object image.

At the stage when the counter 38 has completed the counting of one field, the counted value of the counter 38 is compared with a threshold value $TH_1$ by a comparison circuit 40, and with another threshold value $TH_2$ by a comparison circuit 42. The threshold value $TH_1$ is made larger than the threshold value $TH_2$. The comparison circuits 40 and 42 apply trigger signals to monostable multivibrators (MM) 44 and 46, when the counted value of the counter 38 is larger than the threshold values $TH_1$ and $TH_2$, respectively. The pulse width of the MM 44 is set to be longer than the pulse width of the MM 46. The output pulses of the MMs 44 and 46 are applied as the motor drive prohibiting signal to the motor drive circuit 20 through an OR gate 48.

To explain concretely, when the counted value of the counter 38 is larger than the threshold value $TH_1$ (or the amount of variation of the object image is large), the MMs 44 and 46 both produce the pulses at the same time. Yet, because the pulse width of the MM 44 is wider, the pulse produced from the MM 44 is supplied as the prohibiting signal to the motor drive circuit 20 through the OR gate 48. When the counted value of the counter 38 is smaller than the threshold value $TH_1$ but larger than the threshold value $TH_2$, only the MM 46 responsive to the output of the comparison circuit 42 produces the pulse. This short pulse is applied as the prohibiting signal to the motor drive circuit 20 through the OR gate 48. Also, when the counted value of the counter 38 is smaller than the threshold value $TH_2$ (or the variation of the object image is very small), the MMs 44 and 46 both do not produce the pulses. So, the prohibiting signal is not produced.

Though, in FIG. 7, two systems of circuit comprising the comparison circuits 40 and 42 and MMs 44 and 46 have been used to form the prohibiting signal for the period corresponding to the object varying amount, the number of systems may be increased to three or more. As another variation of the structure, a converting circuit for converting the counted value of the counter 38 to a pulse time may be provided so that when the counted value of the counter 38 is below a predetermined one, no prohibiting signal is produced, and when above it, the prohibiting signal is produced in the form of a pulse whose width is proportional to the counted value.

Though, in the above-described embodiment, the motor drive prohibiting signal from the object image variation detecting circuit 30 is applied to the motor drive circuit 20, a normally closed switch may be provided anywhere in the automatic focusing control loop, and it is this normally closed switch that is opened by the motor drive prohibiting signal.

As is readily understandable from the foregoing description, according to the present invention, even if a variation occurs in the object image by panning, etc., the photographic optical system can be prevented from performing a faulty operation, because the period for which the focus adjustment of the photographic optical system is not made is controlled in accordance with the degree of variation of the object image.

FIG. 9 is a block diagram illustrating the fundamental structure in the second embodiment for accomplishing the second object of the invention. This embodiment is applied not to the case where the movement of the entire image on the image pickup plane is caused by panning as in the first embodiment, but to a case where, while the camera does not move, the object is moving to cause a variation in the object image on the image pickup plane. For the latter case, when focusing on that object, the automatic focusing characteristic is controlled in accordance with the amount of variation. Therefore, without causing a faulty operation to take place by the change of the focus voltage due to the variation of the object or increasing the time necessary to complete the focusing operation, the focusing operation can be performed accurately.

In FIG. 9, a camera circuit 12, a detector 16, a difference-hold circuit 18, a motor drive circuit 20 and a motor 22 are the same as those of the first embodiment shown in FIG. 6.

In FIG. 9, 10A is a focusing lens; 10B is a zoom lens; 24 is a diaphragm; 26 and 28 are switches which move in linkage with each other; 50 is an object image variation detecting circuit for detecting a variation of the object image from the image signal produced from the camera circuit 12. In the illustrated embodiment, two high-pass filters (HPF) 14A and 14B of different low-band cut-off frequency are provided to obtain two kinds of high-frequency signals for the hill climb control. By selectively actuating the switches 26 and 28, the high-frequency signal of different band is applied to the detector 16. The switches 26 and 28 change their switched positions in association with each other in response to the aperture value of the diaphragm 24 and the zooming position of the zoom lens 10B. In general, the frequency range to be chosen as the high-frequency signal in the hill climb control method is in close relationship with the zoom value and the aperture value. That relationship is shown in Tables 1 and 2.

TABLE 1

| Zoom | TELE | WIDE |
| --- | --- | --- |
| High-Frequency Component | Large | Small |

TABLE 2

| Aperture Value | Small | Large |
| --- | --- | --- |
| High-Frequency Component | Large | Small |

Therefore, when the zoom is TELE and the aperture is small, the HPF 14A is selected. When the zoom is WIDE and the aperture is large, the HPF 14B is selected. An event that the zoom is WIDE and the aperture is large is also considered.

For this case, with addition of weight, either may be selected. It is also possible to use three or more kinds of HPFs. Out of these, one may be selected.

Figure 10:
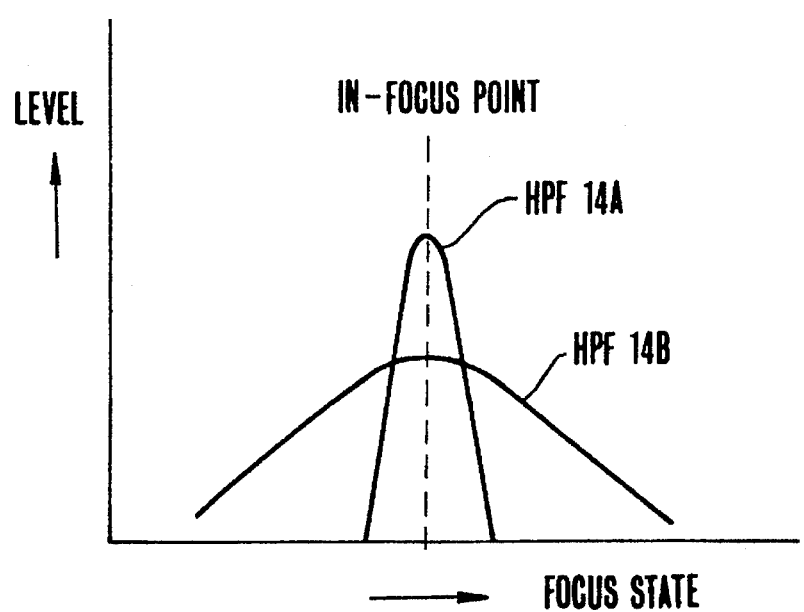
FIG. 10 is a graph illustrating the focus voltage characteristics of the high-pass filter in the embodiment of FIG. 9.

Even in the embodiment of FIG. 9, the automatic focusing control loop comprising the camera circuit 12, HPFs 14A and 14B, detector 16, difference-hold circuit 18, motor drive circuit 20, motor 22 and focusing lens 10A is fundamentally the same as in the case of FIG. 6. Yet, because of the frequency characteristics of the HPFs 14A and 14B, the output of the detector 16 becomes different as shown in FIG. 10. For example, in the case when the HPF 14A whose low-band cut-off frequency is high is selected to operate, the characteristic becomes steep. In the case when the HPF 14B whose low-band cut-off frequency is low is operative, it becomes gentle. Therefore, with the use of the HPF 14A, the location accuracy near the in-focus point can be heightened.

One example of the object image variation detecting circuit 50 is shown in FIG. 11. The object image variation detecting circuit 50 fundamentally, while the image pickup plane of the camera circuit 12 is, as shown in FIG. 8, partitioned transversely and longitudinally to a plurality of sections (in FIG. 8, 5×7), compares the average brightness of each section with that of the same section obtained one field period before to quantitatively detect the amount of variation of the object image. A binary coding circuit 52 averages (or integrates) the brightness value of the video signal from the camera circuit 12 in each section and compares the average value with a predetermined value Y'ref to produce an output in the binary form. The 1-bit signal produced for every section from the binary coding circuit 52 is delayed one field period by a delay circuit 54. As the delay circuit 54 use may be made of either an analog delay line or a digital delay element in the form of a digital memory. An exclusive OR gate 56 compares the output of the binary coding circuit 52 with the output of the delay circuit 54 which is a binary signal obtained in the same section one field period before. If they differ, it produces an output "H". If they coincide, it produces an output "L". A counter 58 counts the output "H" of the exclusive OR gate 56. The counted value over one field of the counter 58 is an index representative of the degree of variation of the object image. The counter 58 is cleared in each one field.

At the stage that the counter 58 has completed the counting operation of one field, the counted value of the counter 58 is compared with a threshold value TH' by a comparison circuit 60. When the counted value of the counter 58 is smaller than its threshold value TH', the comparison circuit 60 applies a switch selection signal for selecting the HPF 14A to the switches 26 and 28. Thus, the HPF 14A is selected. When the counted value is larger than the TH' (the amount of variation of the object image is large), another selection signal which is to select the HPF 14B is applied to the switches 26 and 28. Thus, the HPF 14B is selected. That is, at the time of the large variation of the object, the HPF 14B having a wider detecting range is selected. Where the in-focus is neared and the focus voltage is small, the HPF 14A of steep characteristic and good sensitivity is selected to perform the focusing operation.

Since, in the illustrated example, the two HPFs 14A and 14B are used for selection of either, only one threshold value TH' suffices for coding the counted value of the counter 58 to the binary form. But, the invention is not confined thereto and does not preclude three or more HPFs from using. For this case, the counted value of the counter 58 has to be compared with a plurality of threshold values.

The use of not less than three HPFs (in some case, BPF) gives rise to an opportunity for competition of the selection of the switches 26 and 28, or the HPFs 14A and 14B, with the criterion for selection by the zoom value and the aperture value. In this case, with the one of the HPFs which is selected by the combination of the zoom value and the aperture value being taken as the standard or the center, it may be later replaced by another one whose low-band cut-off frequency is higher or lower depending on the amount of variation of the object image. Of course, an HPF capable of controlling the low-band cut-off frequency from the outside may otherwise be used. For this case, the low-band cut-off frequency of that HPF is controlled in accordance with the zoom value, the aperture value and the output of the object image variation detecting circuit 50.

As is readily understandable from the foregoing description, according to the invention, even if the object image on the image pickup plane is varied as the object is moving, the focusing control can be made to continue by the suitable focus signal responsive to the degree of its variation. Hence, a proper and good focus state can be always obtained.

FIG. 12 is a block diagram of the fundamental structure in the third embodiment for accomplishing the third object of the invention. This embodiment is to select one of the distance measuring areas of different size on the image pickup plane depending on the amount of variation of the object image.

Figure 13:
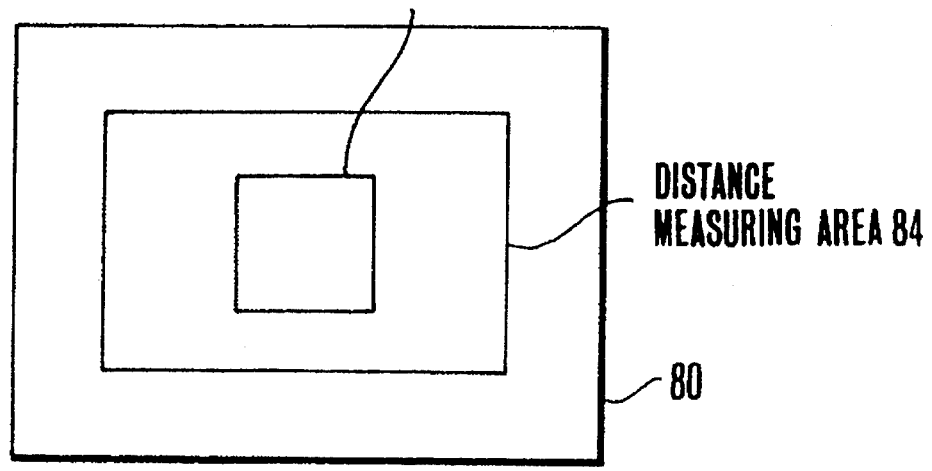
FIG. 13 is a diagram for explaining the selection of the distance measuring area in the embodiment of FIG. 12.

In FIG. 12, a lens 10 serving as a photographic optical system, a camera circuit 12, a high-pass filter (HPF) 14, a detector 16, a difference-hold circuit 18, a motor drive circuit 20 and a motor 22 constitute a focusing control loop for the lens 10 which is similar to that of the first embodiment shown in FIG. 6 and the second embodiment shown in FIG. 9. Therefore, its explanation is omitted here. According to this embodiment, a gate circuit 62 is provided between the camera circuit 12 and the HPF 14 to take out that video signal which corresponds to the selectively set distance measuring area on the image pickup plane in passing therethrough. As shown in FIG. 13, two distance measuring areas 82 and 84 are defined on the image pickup plane 80. The gate circuit 62 can extract only a part of the image signal which corresponds to either one of the areas 82 and 84 when the image signal passes therethrough.

From the video signal produced from the camera circuit 12, the amount of variation of the object image is detected by an object image variation detecting circuit 64. In the illustrated embodiment, in response to the detection signal of the object image variation detecting circuit 64, the pass band of the gate circuit 62 is made to alter. That is, within a frame 80 of the image pickup plane of the camera circuit 12 in FIG. 13, either one of the distance measuring areas 82 and 84 is selected in response to the detection signal.

Figure 14:
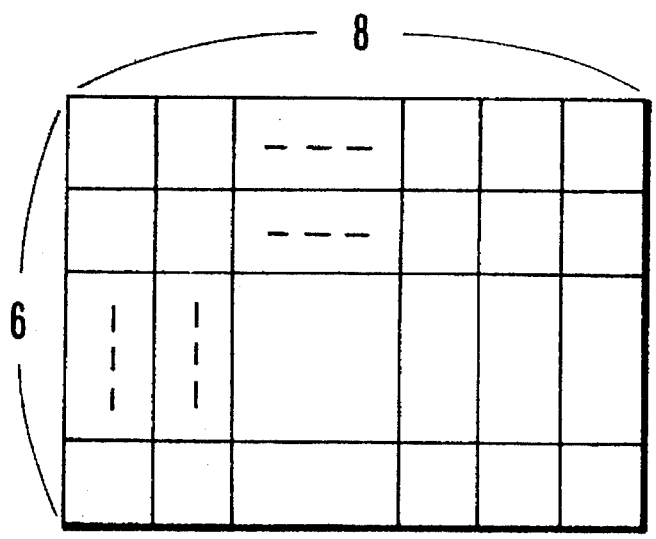
FIG. 14 is a diagram illustrating an example of partition of the light receiving plane.
Figure 15:
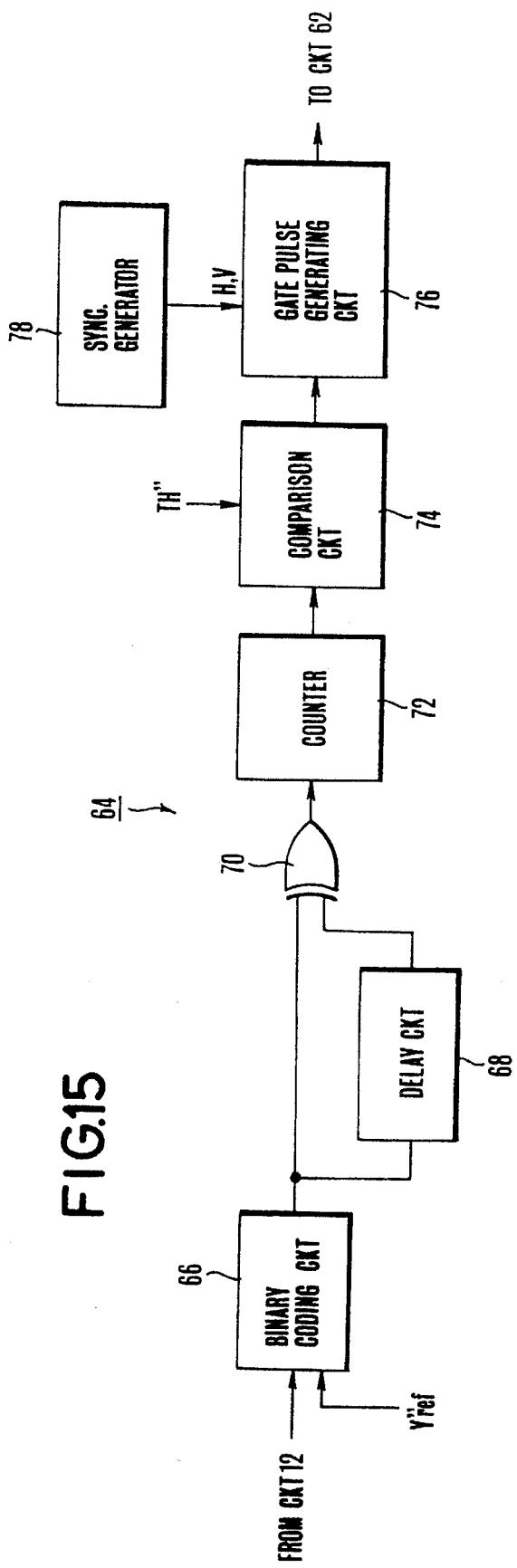
FIG. 15 is a block diagram of the object image variation detecting circuit in the embodiment of FIG. 12.

An example of the object image variation detecting circuit 64' is shown in FIG. 15. The object image variation detecting circuit 64 fundamentally, while the light receiving plane of the camera circuit 12 is partitioned transversely and longitudinally as shown in FIG. 14 to a plurality of sections (in FIG. 14, 6×8), compares the average brightness of each section with that of the same section obtained one field period before to quantitatively detect the amount of variation of the object image. The brightness value of the video signal from the camera circuit 12 is averaged (or integrated) in each section, and then compared with a predetermined value Y"ref by a binary coding circuit 66 which produces an output in the binary form. A delay circuit 68 delays the 1-bit signal (logic 0 or 1) produced for every section from the binary coding circuit 66 by one field period. As the delay circuit 68 use may be made of either an analog delay line or a digital delay element in the form of a digital memory. An exclusive OR gate 70 compares the output of the binary coding circuit 66 with the output of the delay circuit 68 which is the binary signal obtained in the same section one field period before, upon difference to produce an output "H" or upon coincidence to produce an output "L". A counter 72 counts the number of outputs "H" produced from the exclusive OR gate 70 over one field. The counted value for one field of the counter 72 is used as the index representative of the degree of variation of the object image. The counter 72 is cleared in each field.

At the stage that the counter 72 has completed the counting operation of one field, the counted value of the counter 72 is compared with a threshold value TH" by a comparison circuit 74. When the counted value of the counter 72 is smaller than the threshold value TH", the comparison circuit 74 applies a control signal for selection of the small distance measuring area 82 to a gate pulse generating circuit 76. When above the threshold value TH", it applies another control signal for selection of the large distance measuring area 84 to the gate pulse generating circuit 76. A sync. generator 78 in the camera produces synchronizing signals, vertical and horizontal, which are applied to a gate pulse generating circuit 76. Therefore, in the case of a small amount of variation of the object image, it is made possible to increase the focusing accuracy because of the little probability of the object image falling outside the distance measuring area, since the small distance measuring area is selected. When the amount of variation of the object image is large, the distance measuring area can be enlarged in size so as not to miss catching of the object image therein. Thus, the focusing operation can be performed always in a stable manner despite the movement of the object. Though the embodiment of FIGS. 12 and 13, because of its using the type of selection of either one of the two distance measuring areas 82 and 84 has been described in connection with the sufficiency of only one threshold value TH" for converting the counted value of the counter 72 to binary form, the invention is not confined thereto. It does not preclude the distance measuring area from varying in size in three or more discrete values or continuously. That is, the size of the distance measuring area may be continuously widened depending on the counted value of the counter 72.

In the case of a device that the size of the distance measuring area is adjusted in accordance with the lens state (object distance, zoom value, etc.), while the adjusted distance measuring area is taken as the standard, the distance measuring area may be enlarged or reduced depending on the amount of variation of the object image.

As is readily understandable from the foregoing description, according to the invention, when the object image on the light receiving plane is varied as panning is carried out, or the object moves, the most appropriate one of the distance measuring areas to the degree of its variation can be selected. Hence, an optimum focusing control can be realized.

It should be noted that in all the above-described embodiments, any one takes an example of the so-called Hill Climb method shown in FIG. 1 in which, with attention to the correspondence of the high-frequency wave component in the video signal to the degree of fineness of the picked-up image, the focus adjusting ring of the photographic optical system is rotated so as to maximize high-frequency component. But, the invention is applicable to any other focusing types in which the image signal is used for focus adjustment.

Also, the above-described embodiments each have been described in connection with the respective individual capability as aimed at independently of the others. Their capabilities can be imparted either in separation or in combination all at once to a single device. In principle, by using the means for detecting the amount of variation of the object image in common and differentiating its dynamic range of operation, all the capabilities of the embodiments can be realized in one and the same device.

In more detail, in the combination of the first embodiment (FIG. 6) and the second embodiment (FIG. 9), upon consideration of the fact that, for example, panning, because of its moving the whole of the image on the image pickup plane, causes a large total sum of the amounts of variation over the entire area of the picture frame, while when a subject of principal interest only is moving, the total sum of the amounts of variation over the entire area of the picture frame is small, the focusing operation of the second embodiment of FIG. 9 may otherwise be performed when below the threshold value $TH_2$ in FIG. 7, (or when $TH_2 > TH'$).

Also, instead of always using $TH_2 > TH'$, these operational conditions may be selectively used depending on the given situation.

Also, it is possible, needless to say, to bring the third embodiment (FIG. 12) into combination. Particularly when it is combined with the second embodiment, the focusing operation can more accurately be performed.

Though, in the foregoing, the present invention has been described in connection with the individual objects thereof which take the respective constructional features, it can be realized in the form of an automatic focusing device having all these features.

What is claimed is:

1. An automatic focusing device comprising:
   (A) image pickup means for converting an object image formed on an image pickup plan to an electrical signal;
   (B) gate means for passing only a part of a picked-up image signal produced from said image pickup means, said part corresponding to a focus detecting area defined on said image pickup plane;
   (C) object image variation detecting means for detecting an amount of a variation of the object image on said image pickup plane including
      a coding circuit for converting a predetermined component of the image signal in each of a plurality of areas defined on said image pickup plane to a digital value with respect to a predetermined threshold level and
      a discrimination circuit for comparing an output of said coding circuit with an output produced a predetermined period before to discriminate the presence of a variation of the object image in each of said areas and to output an information relative to the amount of a variation of the object image; and
   (D) gate control means for controlling said gate means to change the size of said focus detecting area in response to an output of said object image variation detecting means.

2. A device according to claim 1, wherein said gate means sets large and small focus detecting areas on said image pickup plane and selectively passes the picked-up image signals corresponding to each of said focus detecting areas.

3. A device according to claim 2, wherein said object image variation detecting means quantitatively detects the amount of variation of the object image in each predetermined period.

4. A device according to claim 3, wherein said object image variation detecting means detects a variation of the picked-up image signal in each of a plurality of areas set on said image pickup plane, and computes the detection result in each area to detect the total amount of variation.

5. A device according to claim 4, wherein said object image variation detecting means includes:
   (A) a binary coding circuit for converting a brightness value of the picked-up image signal in each of the plurality of areas set on said image pickup plane to a binary value with respect to a predetermined threshold level;
   (B) a discrimination circuit for comparing an output of said binary coding circuit with the output produced a predetermined period before to discriminate the presence of a variation of the object image in each of said areas; and
   (C) a counter for counting the number of said areas in which the presence of the variation is discriminated by said discrimination circuit,
   so that the variation of the object image can be quantitatively detected from an output of said counter.

6. A device according to claim 2 or 5, wherein said gate control means changes over the pass characteristic of said gate means such that the picked-up image signal corresponding to the large focus detecting area on said image pickup plane is caused to pass therethrough when the amount of variation of the object image detected by said object image variation detecting means is above a predetermined value, and the picked-up image signal corresponding to the small focus detecting area on said image pickup plane is caused to pass therethrough when the amount of variation is below the predetermined value.

7. A device according to claim 6, wherein said object image variation detecting means is arranged to transversely and longitudinally divide said image pickup plane into a plurality of blocks, to detect a binary value of a brightness value of each of said blocks and to obtain a total amount of the blocks where variations occur in picture planes at different times, as an amount of variation of the picture planes.

8. A device according to claim 1 or 7, further comprising:
   (A) focus detecting means for detecting a focus degree on the basis of said part of the picked-up image signal corresponding to said focus detecting area passed by said gate means; and
   (B) focus adjusting means for adjusting a focus condition of said apparatus according to an output of said focus detecting means.

9. A device according to claim 8, wherein said focus degree is a level of a high frequency component in said image signal.

10. An automatic focusing device comprising:
   (A) image pickup means for converting an object image formed on an image pickup plane to an electrical image signal;
   (B) photographic optical system control means for automatically controlling a photographic optical system toward an in-focus position based on the picked-up image signal produced from said image pickup means;
   (C) gate means for passing a part of the image signal produced from said image pickup means, said part corresponding to a focus detecting area on said image pickup plane;
   (D) object image variation detecting means, including a coding circuit means for converting the image signal to a digital signal with respect to a predetermined threshold level, for comparing the digital signal obtained by said coding circuit means with the digital signal output from said coding circuit means before a predetermined period of time to detect the amount of variation of the object image on said image pickup plane; and (E) control means for controlling said gate means to change a size of said focus detecting area in response to an output of said object image variation detecting means.

11. A device according to claim 10, wherein said gate means sets at least two, large and small, focus detecting areas on said image pickup plane and selectively sets the large or small focus detecting area, depending upon an output of said object image variation means.

12. A device according to claim 11, wherein said control means changes over the pass characteristic of said gate means such that the picked-up image signal corresponding to the large focus detecting area on said image pickup plane is caused to pass therethrough when the amount of variation of the object image detected by said object image variation detecting means is above a predetermined value, and the picked-up image signal corresponding to the small focus detecting area on said image pickup plane is caused to pass therethrough when the amount of variation is below the predetermined value.

13. A device according to claim 10, wherein said object image variation detecting means quantitatively detects the amount of variation of the object image in each predetermined period.

14. A device according to claim 13, wherein said object image variation detecting means detects a variation of the picked-up image signal in each of a plurality of areas set on said image pickup plane, and computes the detection result in each area to detect the total amount of variation.

15. A device according to claim 14, wherein said object image variation detecting means includes:

(A) a binary coding circuit for converting a brightness value of the picked-up image signal in each of the plurality of areas set on said image pickup plane to a binary value with respect to a predetermined threshold level;

(B) a discrimination circuit for comparing an output of said binary coding circuit with the output produced a predetermined period before to discriminate the presence of a variation of the object image in each of said areas; and (C) a counter for counting the number of said areas in which the presence of the variation is discriminated by said discrimination circuit, so that the variation of the object image can be quantitatively detected from an output of said counter.

16. An automatic focusing device comprising:

(A) image pickup means for converting an object image formed on an image pickup plane to an electrical image signal;

(B) extracting means for extracting the image signal of a predetermined frequency component from the image signal from said image pickup means in passing therethrough;

(C) gate means for passing a part of the image signal produced from said image pickup means, said part corresponding to a focus detecting area defined on said image pickup plane;

(D) object image variation detecting means, including a coding circuit means for converting the image signal to a digital signal with respect to a predetermined threshold level, for comparing the digital signal obtained by said coding circuit means with the digital signal output from said coding circuit means before a predetermined period of time to detect the amount of variation of the object image on said image pickup plane; and (E) control means for controlling said gate means to change a size of said focus detecting area in response to an output of said object image variation detecting means.

17. A device according to claim 16, wherein said pass characteristic varying means changes over the pass characteristic of said gate means such that the picked-up image signal corresponding to the large focus detecting area on said image pickup plane is caused to pass therethrough when the amount of variation of the object image detected by said object image variation detecting means is above a predetermined value, and the picked-up image signal corresponding to the small focus detecting area on said image pickup plane is caused to pass therethrough when the amount of variation is below the predetermined value.

18. A device according to claim 16, wherein said object image variation detecting means quantitatively detects the amount of variation of the object image in each predetermined period.

19. A device according to claim 18, wherein said object image variation detecting means detects a variation of the picked-up image signal in each of a plurality of areas set on said image pickup plane, and computes the detection result in each area to detect the total amount of variation.

20. A device according to claim 19, wherein said object image variation detecting means includes:

(A) a binary coding circuit for converting a brightness value of the picked-up image signal in each of the plurality of areas set on said image pickup plane to a binary value with respect to a predetermined threshold level;

(B) a discrimination circuit for comparing an output of said binary coding circuit with the output produced a predetermined period before to discriminate the presence of a variation of the object image in each of said areas; and (C) a counter for counting the number of said areas in which the presence of the variation is discriminated by said discrimination circuit, so that the variation of the object image can be quantitatively detected from an output of said counter.

21. An object image variation detecting device comprising:

(A) image pickup means;

(B) binary coding means for comparing a brightness component of a picked-up image signal corresponding to each of a plurality of areas set on an image pickup plane of said image pickup means with a predetermined valued to produce an output in binary form;

(C) comparing means for comparing a brightness value of each of said areas binary-coded by said binary coding means with the brightness value of each of said areas produced a predetermined period before; and (D) a counter for counting and outputting the number of said areas in which a variation before and after said predetermined period is detected by said comparing means.

22. A device according to claim 21, further comprising:

(A) setting means for setting a detecting area for extracting a predetermined component from the image signal of the image pick-up means at a predetermined position of image pick-up plane of said image pick-up means; and (B) detecting area control means for changing the detecting area set by said setting means, according to the output of said counter.

23. A device according to claim 22, wherein said detecting area control means changes a size of said detecting area.

24. A device for setting a detecting area on an image pickup plane of an image pickup means for converting an object image formed on an image pickup plane to an electrical image signal, comprising:

(A) setting means for setting said detecting area at a predetermined position on said image pickup plane;

(B) extracting means for extracting a predetermined signal component in said image signal corresponding to said detecting area;

(C) object image variation detecting means, including a coding circuit means for converting the image signal to a digital signal with respect to a predetermined threshold level, for detecting a variation of the subject image on said image pickup plane on the basis of a variation of the coded digital signal output from said coding circuit means; and (D) detecting area control means for changing a characteristic of said detecting area according to the output of said object image variation detecting means.

25. A device according to claim 24, wherein said detecting area control means is arranged to control said setting means on the basis of the output of said object image variation means, to change the size of said detecting area, so that said detecting area is enlarged when said variation is large and said detecting area is reduced when said variation is small.

26. A device according to claim 25, further comprising:

focus adjusting means for adjusting a focusing state of said object image relative to said image pickup plane on the basis of said predetermined component extracted by said extracting means.

27. An image sensing device comprising:

(A) image pickup means for converting an object image formed on an image pickup plane to an electrical signal;

(B) extracting means for extracting a part of the image signal output from said image pickup means, said part corresponding to an area on said image pickup plane;

(C) object image variation detecting means, including a coding circuit means for converting the image signal to a digital signal with respect to a predetermined threshold level, for detecting an amount of a variation of the object image on said image pickup plane on the basis of a variation of the coded digital signal output from said coding circuit means; and (D) control means for controlling said extracting means to change a size of the area on said image pickup plane on the basis of an output of said image variation detecting means.

28. A device according to claim 27, wherein said image variation detecting means quantitatively detects the amount of variation of the object image in each predetermined period.

29. A device according to claim 28, wherein said image variation detecting means detects a variation of the picked-up image signal in each of a plurality of areas set on said image pickup plane, and computes the detection result in each area to detect the total amount of variation.

30. A device according to claim 29, wherein said image variation detecting means includes:

(A) a binary coding circuit for converting a brightness value of the picked-up image signal in each of the plurality of areas set on said image pickup plane to a binary value with respect to a predetermined threshold level;

(B) a discrimination circuit for comparing an output of said binary coding circuit with the output produced a predetermined period before to discriminate the presence of a variation of the object image in each of said areas; and (C) a counter for counting the number of said areas in which the presence of the variation is discriminated by said discrimination circuit, so that the variation of the object image can be quantitatively detected from an output of said counter.

31. A device according to claim 27, wherein said extracting means sets at least two respectively large and small areas on said image pickup plane and selectively sets the large area or the small area, depending upon an output of said image variation means.

32. A device according to claim 31, wherein said control means changes over the pass frequency band characteristic of said extracting means such that the picked-up image signal corresponding to the large area on said image pickup plane is caused to pass therethrough when the amount of variation of the object image detected by said object image variation detecting means is above a predetermined value, and to pass therethrough the picked-up image signal corresponding to the small area on said image pickup plane when the amount of variation is below the predetermined value.

33. A device according to claim 32, wherein said small and large areas are focus detecting areas.

* * * * *

UNITED STATES PATENT AND TRADEMARK OFFICE
CERTIFICATE OF CORRECTION

PATENT NO. : 5,619,264
DATED     : April 8, 1997
INVENTOR(S) : Yoshimura et al.

It is certified that error appears in the above-identified patent and that said Letters Patent are hereby corrected as shown below:

Col. 1, line 6,    delete "13"    and insert -- 31 --.

Col. 3, line 17,   delete "an".

Col. 9, line 52,   delete " 64' "    and insert -- 64 --.

Col. 12, line 30,  delete "claim 6"   and insert -- claim 5 --.

Signed and Sealed this

Tenth Day of March, 1998

Attest:

BRUCE LEHMAN

Attesting Officer

Commissioner of Patents and Trademarks